Figure 1:
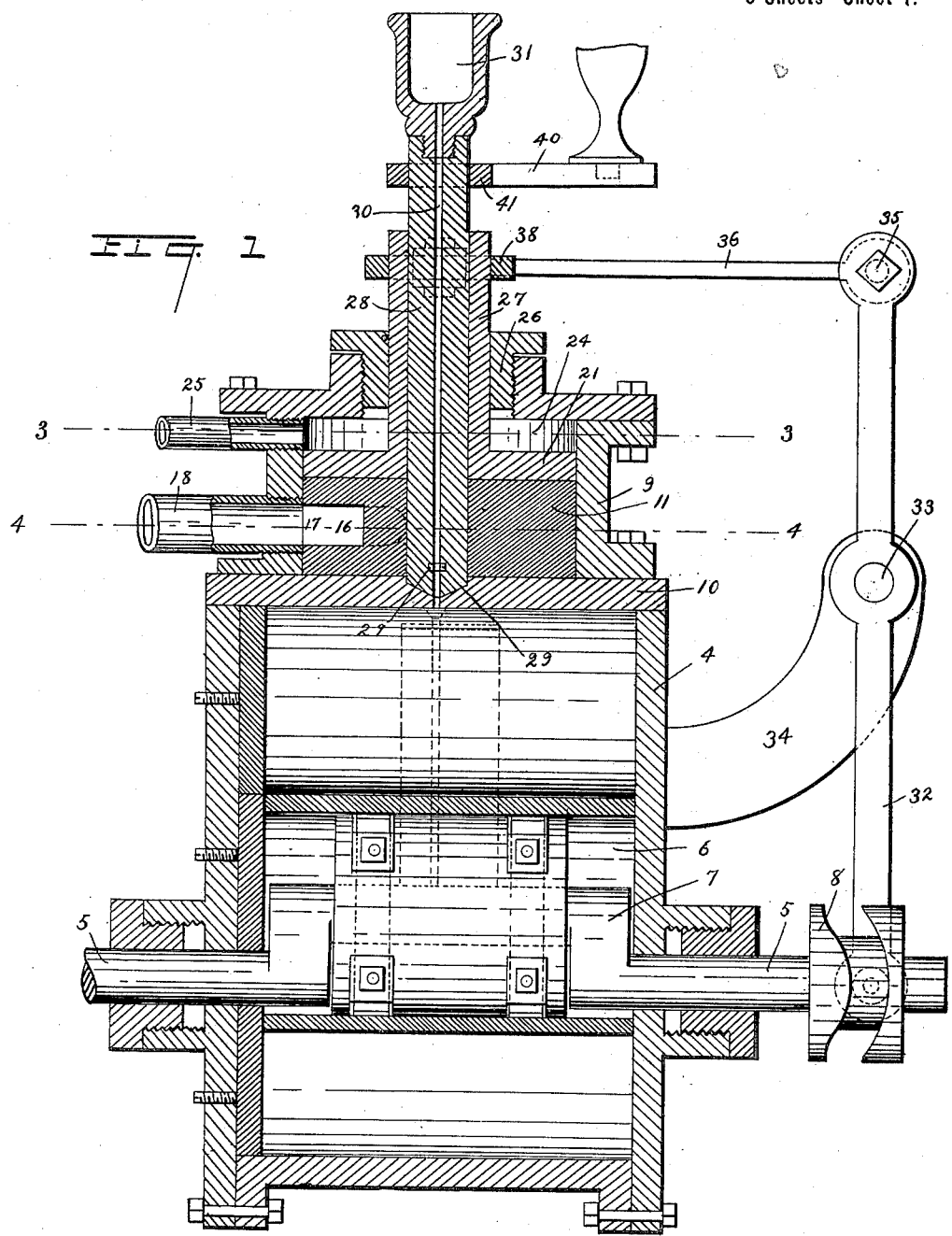

No. 661,525. Patented Nov. 13, 1900.
N. HENQUIN.
VALVE MECHANISM.
(Application filed July 25, 1900.)
(No Model.) 3 Sheets—Sheet 1.

WITNESSES
INVENTOR
Nestor Henquin
BY
ATTORNEYS

No. 661,525. Patented Nov. 13, 1900.
N. HENQUIN.
VALVE MECHANISM.
(Application filed July 25, 1900.)

(No Model.) 3 Sheets—Sheet 2.

WITNESSES
INVENTOR
Nestor Henquin
BY
ATTORNEYS

No. 661,525. Patented Nov. 13, 1900.
N. HENQUIN.
VALVE MECHANISM.
(Application filed July 25, 1900.)

(No Model.) 3 Sheets—Sheet 3.

WITNESSES
Elwood Bell
F. W. Stewart

INVENTOR
Nestor Henquin
BY
ATTORNEYS

UNITED STATES PATENT OFFICE.

NESTOR HENQUIN, OF SCHENECTADY, NEW YORK.

VALVE MECHANISM.

SPECIFICATION forming part of Letters Patent No. 661,525, dated November 13, 1900.

Original application filed March 6, 1900, Serial No. 7,457. Divided and this application filed July 25, 1900. Serial No. 24,851. (No model.)

*To all whom it may concern:*

Be it known that I, NESTOR HENQUIN, a citizen of the United States, residing at Schenectady, in the county of Schenectady and State of New York, have invented certain new and useful Improvements in Valve Mechanism, of which the following is a full and complete specification, such as will enable those skilled in the art to which it appertains to make and use the same.

This invention relates to valve mechanism; and the object thereof is to provide a valve mechanism for rotary and other engines which shall be positive and automatic in action and simple in construction.

The present application is a divisional application based upon a prior application filed March 6, 1900, Serial No. 7,457, for rotary engines.

My invention is fully disclosed in the following specification, of which the accompanying drawings form a part, in which like reference characters denote like parts in the several views, and in which—

Figure 2:
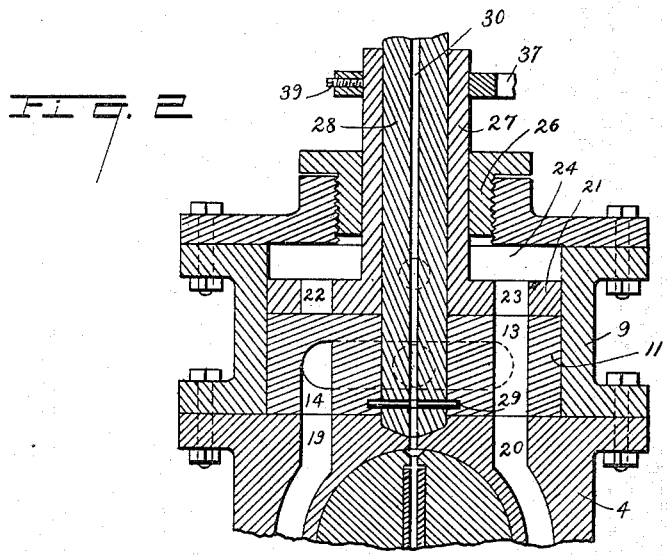
Figure 3:
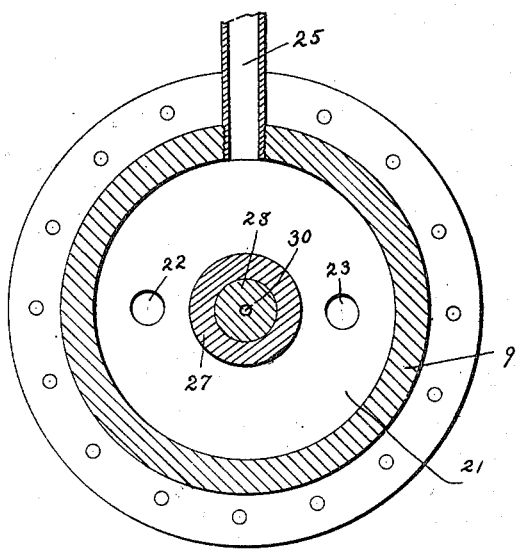
Figure 4:
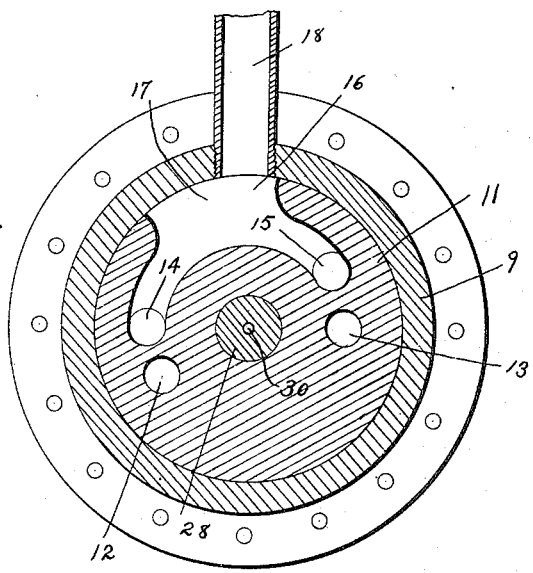

Figure 1 is a longitudinal vertical section of a rotary engine provided with a valve mechanism constructed according to my invention; Fig. 2, a partial central transverse vertical section of Fig. 1; Fig. 3, a section of Fig. 1 upon the line 3 3 thereof, and Fig. 4 a section of Fig. 1 upon the line 4 4 thereof.

Referring more particularly to the drawings, I have shown at 4 the cylinder of an engine, which in the present instance is of the rotary type and provided with a motor-shaft 5, which is driven by a piston 6, mounted upon a crank-elbow 7, formed upon the said motor-shaft. It is understood, however, that the form of cylinder, piston, and motor-shaft and the mounting of the same are immaterial to my invention and are only shown in the present application as incidental to a cam 8, which is mounted upon the motor-shaft and the operation of which will be hereinafter described. Upon the cylinder 4 is superposed a valve-casing 9, provided with a circular inner periphery, and mounted upon the base-plate 10 thereof, which in the present instance constitutes the crown-plate of the cylinder, is a circular reverse-valve plate 11, provided in radial lines thereof, which are less than one hundred and eighty degrees apart, with two transverse feed-ports 12 and 13, respectively. The valve-plate 11 is also provided with two exhaust-ports 14 and 15, which open at the bottom thereof, but do not open through the top thereof, and both of which communicate with an exhaust-chamber 16, which is segmental in form and provided with a wide-open mouth portion 17, which opens at one side of the valve-plate 11 and communicates at all times with an exhaust-pipe 18, which is fixed in the valve-casing 9 at one side thereof. The exhaust-chamber 16 is not open at the top or bottom of the valve-plate 11 and only through the mouth 17. The exhaust-ports 14 and 15 are arranged in lines radially of the valve-plate 11, which are less than one hundred and eighty degrees apart, and the preferable relative arrangement of the feed-ports 12 and 13 and the exhaust-ports 14 and 15 is such that the ports 13 and 15 are arranged at one side of the valve-plate and separated relatively by a distance measured upon the circumference of a circle passing through both thereof equivalent to the circumferential distance measured upon the same circle between the ports 12 and 14.

The base-plate 10 of the valve-casing or the crown-plate of the cylinder is provided with two ports 19 and 20, and said ports are arranged diametrically oppositely, the relative arrangement thereof and of the ports 12, 13, 14, and 15 being such that when the valve-plate 11 is turned into position to bring the port 13 into communication with the port 20 the port 19 will be in communication with the port 14. It follows, therefore, that when the valve-plate 11 is turned to bring the port 12 into communication with the port 19 the port 15 will be in communication with the port 20. Hence, as hereinafter described, as the steam is always admitted through the ports 12 and 13 and exits through the ports 14 and 15, when the port 13 is admitting steam to the port 20 the port 14 is receiving the exhaust-steam from the port 19, and when the port 12 is admitting steam to the port 19 the port 15 is receiving exhaust-steam from the port 20. It is seen from the above that the ports 19 and 20 alternately operate upon reversal of the engine as feed and exhaust ports, respectively. Revolubly mounted upon the reverse-valve plate 11 is a feed-valve plate 21, (shown in detail in Fig. 2,) provided with two diametrically oppositely arranged transverse ports 22 and 23, respectively, which are arranged to respectively alternately register with the ports 12 and 13 in the valve-plate 11 upon rotation of the valve-plate 21. Above the valve-plate 21 is formed a steam-chest 24, which is fed with steam by a supply-pipe 25 at one side of the valve-casing 9. The steam-chest 24 is closed at the top by a stuffing-box 26, centrally through which passes a turnable valve-sleeve 27, which is formed integral or otherwise and rigidly connected with the valve-plate 21.

Passing turnably through the valve-sleeve 27 is a reverse-valve rod 28, which likewise passes turnably and centrally through the valve-plate 21 and centrally through the valve-plate 11, being fixed thereto by keys or pins 29, and the valve-rod 28 projects above the valve-sleeve 27 and is provided with a central oil-passage 30, arranged to communicate at its lower end with the cylinder mechanism, as clearly shown in Fig. 1. The valve-rod 28 is provided at its upper end with an oil-cup 31, which communicates with the oil-passage 30. The motor-shaft 5 is, as above stated, provided with a cam 8, in connection with which operates in the usual or any desired manner the lower end of a cut-off rod 32, which has a rocking bearing at 33 upon an arm 34, secured to the adjacent end of the cylinder 4. Pivoted to the upper end of the cut-off rod 32 at 35, at one end, is a supplemental cut-off rod 36, the other end of which is pivoted to an arm 37, connected with the valve-sleeve 27 by means of a collar 38, passed thereabout and detachably connected therewith by means of a set-screw 39. The arm 36 is shown in Fig. 2 and in dotted lines in Fig. 1. The reverse-handle 40 is detachably connected with the valve-rod 28 by means of a collar 41 and a set-screw 42, passed therethrough. The cut-off-valve rod 32 is so operatively connected that the cam 8 and cut-off rod 36 and arm 37 are so operatively connected with the valve-sleeve 27 that the feed-valve 21 will be operated upon rotation of the motor-shaft 5 to intermittently bring the port 23 into communication with the port 13 at predetermined intervals, as regulated by the cylinder mechanism, whereby the steam is admitted from the steam-chest 24 to the cylinder 4 and at just such times as required in the actuation of the crank-elbow 7. Upon further movement of the motor-shaft 5 the cam 8 shuts the steam from the feed-ports 23 and 13 and the latter ports remain closed, the steam exhausting through the port 14 from the port 19. When the ports 23 and 13 are in registration, as above described, steam is admitted to the feed-port 20, which communicates with the cylinder 4.

When it becomes necessary in the movement of the motor-shaft 5 to again admit steam to the port 20, the cam 8 operates to rotate the valve-sleeve 27 in such manner that the port 23 and port 13 will again come into communication therewith, the exhaust-port 14 being cut off from the port 19.

When it is desired to reverse the motion of the engine or of the motor-shaft 5, the cylinder 4 is turned to rotate the valve-rod 28 and valve 11, bringing the port 22 into registration with the port 12 and cutting off communication between the ports 23 and 13; furthermore, bringing the port 19 into communication with the port 12 and the port 20 into communication with the port 15. It is therefore manifest that the port 20 will thus become the exhaust-port and the port 27 the feed-port.

It is manifest that the improved valve mechanism herein described is of few and simple parts, is positive in action, and is adaptable to a wide range of engines and motors, and I do not limit myself to the specific construction and arrangements of parts herein specified, reserving the right to vary the same within the scope of my invention.

Having fully described my invention, I claim as new and desire to secure by Letters Patent—

1. In an improved valve mechanism, a cylinder, an ingress and an egress port communicating therewith, a reverse-valve provided with an exhaust-chamber and with two ports communicating therewith and with two other ports formed transversely therethrough, the ports in said reverse-valve being arranged to be brought into registration with said ingress and said egress port and a feed-valve provided with ports arranged to be brought into registration with the ports formed transversely through said reverse-valve, substantially as shown and described.

2. In an improved valve mechanism, a cylinder, an ingress and an egress port communicating therewith, a reverse-valve provided with an exhaust-chamber and with two ports communicating therewith and with two other ports formed through said reverse-valve, said ports in said reverse-valve being arranged to be brought into registration with said ingress and said egress port, a feed-valve provided with ports arranged to be brought into registration with the ports transversely through said reverse-valve, a valve-rod fixed to said reverse-valve, and a valve-sleeve fixed to said feed-valve and through which said reverse-valve rod passes, and means for oscillating said sleeve, substantially as shown and described.

3. In an improved valve mechanism, a cylinder, an ingress and an egress port communicating therewith, a reverse-valve provided with an exhaust-chamber and with two main ports communicating therewith, and with two supplemental ports, said ports in said reverse-valve being arranged to be brought into registration with said ingress and said egress port respectively, a feed-valve provided with ports arranged to be brought into registration with the said supplemental ports formed in said reverse-valve, said reverse-valve being provided with a projecting valve-rod and said feed-valve being provided with a projecting sleeve through which said valve-rod passes, means for intermittently oscillating said feed-valve sleeve and a handle, whereby said reverse-valve rod may be operated, substantially as shown and described.

4. In an improved valve mechanism, a cylinder, an ingress and an egress port communicating therewith, a reverse-valve provided with an exhaust-chamber and with two main ports communicating therewith, and with two supplemental ports, said ports in said reverse-valve being arranged to be brought into registration with said ingress and said egress port respectively, a feed-valve provided with ports arranged to be brought into registration with said supplemental ports formed in said reverse-valve, said reverse-valve being provided with a projecting valve-rod, and said feed-valve being provided with a projecting sleeve through which said reverse-valve rod passes, means for intermittently oscillating said feed-valve sleeve and said reverse-valve rod being chambered longitudinally, constituting an oil-passage for the several operative parts of the engine, substantially as shown and described.

5. A valve mechanism, comprising a reverse-valve 11 provided with an exhaust-chamber 16, and with two main ports 14 and 15 communicating therewith, and with two supplemental ports 12 and 13, and a feed-valve 21 provided with ports 22 and 23 arranged to be brought into registration with the ports 12 and 13 in said reverse-valve 11, substantially as shown and described.

6. A valve mechanism, comprising a reverse-valve 11 provided with an exhaust-chamber 16, and with two main ports 14 and 15 communicating therewith, said exhaust-chamber and ports 14 and 15 passing but partially through the valve 11, said reverse-valve 11 being provided with two supplemental ports 12 and 13, passing entirely therethrough, and a feed-valve 21 provided with ports 22 and 23 which pass transversely therethrough and are arranged to be brought into registration with the ports 12 and 13 in the reverse-valve 11, substantially as shown and described.

7. An improved valve mechanism, comprising a valve-casing, a reverse-valve rotatably arranged therein, and a feed-valve rotatably arranged therein, and superposed upon said reverse-valve, said valve-casing being provided beneath said reverse-valve with steam-ports and being provided above said feed-valve with a steam-chest or steam-supply, said reverse-valve being provided with an exhaust-chamber and with two main ports communicating therewith, and with two supplemental ports formed transversely through said reverse-valve, said main and supplemental ports in said reverse-valve being arranged to be brought into registration with said steam-ports in the bottom of said valve-casing, said feed-valve being provided with two transverse ports arranged to be brought into registration with said supplemental ports in said reverse-valve, and means for operating said feed-valve, substantially as shown and described.

In testimony that I claim the foregoing as my invention I have signed my name, in presence of the subscribing witnesses, this 30th day of June, 1900.

NESTOR HENQUIN.

Witnesses:
JOHN D. MILLER,
ALEX. J. THOMSON.